United States Patent
Huang et al.

(10) Patent No.: US 12,229,299 B1
(45) Date of Patent: Feb. 18, 2025

(54) ONE WAY DATA MIGRATION SYSTEM

(71) Applicant: Bank of America Corporation, Charlotte, NC (US)

(72) Inventors: Tao Huang, Bellevue, WA (US); Kent Steger, Huntersville, NC (US); Ramakrishna Yannam, The Colony, TX (US); Xianhong Zhang, Issaquah, WA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/381,685

(22) Filed: Oct. 19, 2023

(51) Int. Cl.
*G06F 21/62* (2013.01)
*G06F 21/31* (2013.01)

(52) U.S. Cl.
CPC .......... *G06F 21/6218* (2013.01); *G06F 21/31* (2013.01)

(58) Field of Classification Search
None
See application file for complete search history.

(56) References Cited

U.S. PATENT DOCUMENTS

| | | | |
|---|---|---|---|
| 10,986,084 B1 * | 4/2021 | Dobbs, II | H04L 9/3226 |
| 11,321,448 B1 * | 5/2022 | Sanchez | H04L 9/3236 |
| 2007/0083917 A1 * | 4/2007 | Peterson | H04L 63/08 726/5 |
| 2021/0297256 A1 * | 9/2021 | Stolbikov | H04L 9/3226 |
| 2023/0334026 A1 * | 10/2023 | Srinivasan | G06F 16/119 |

* cited by examiner

*Primary Examiner* — Kavita Stanley
*Assistant Examiner* — Cao D Vuong
(74) *Attorney, Agent, or Firm* — Weiss & Arons LLP

(57) ABSTRACT

A one-way data migration system may shift authentication data from a legacy database to a current database. The system may include one or more databases, a mobile device, a mobile device processor, a backend server, a backend receiver, a backend processor, and a backend transmitter. The backend transmitter may transmit requests to the mobile device. The backend receiver may receive the usernames and passwords. The backend processor may authenticate the input usernames and passwords using a hash previously stored within a first database. The backend processor may create a current or updated hash for the password. The system may change the underlying pathway from a pathway associated with the hash previously stored within the first database to a current pathway associated with the current hash. A second database may store the current hash. Following storage of the current hash, the processor may flag the username and/or password as migrated.

19 Claims, 10 Drawing Sheets

ONE WAY DATA MIGRATION SYSTEM

FIELD OF TECHNOLOGY

Aspects of the disclosure relate to data migration.

BACKGROUND OF THE DISCLOSURE

Currently, system administrations may be prevented from storing passwords.

In order to enable system users to authenticate into a system on a continuous basis, system administrations have stored a hash produced by a hash algorithm that received the password as an input. Hashing algorithms typically receive input, process the input and produce an output.

It should be noted that hashing algorithms are one-way algorithms, in which the output cannot be used to recreate the input. As such, in the event that the hash outputs are obtained by a person of malicious intent, the person of malicious intent is unable to recreate the password from the hash output.

However, the hash output can be used to authenticate a user. When the hashing algorithm remains the same, an input password can be re-processed using the hash algorithm to output a current hash. The current hash can be compared to the stored hash. In the event that the current hash is identical to the stored hash, system administrators can assume that the input password was the same password originally input.

Most systems use a unique hashing algorithm in order to process passwords and any other suitable data. Therefore, difficulties arise when a system administration attempts to migrate data from one database to another database. The issue may be compounded when the hashing algorithm is updated and changed at the current database.

Therefore, it would be desirable to create a system and method in which password data can be migrated from one database to another database. It would be further desirable for the updated hashing algorithm, used to generate a hash corresponding to the password, to generate a hash with a relatively larger number of bits than appears in conventional algorithms, to increase the security associated with the stored hash. Additionally, such an updated hashing algorithm, that processes input using an increased bitstream of 512, as opposed to a 256-bit hashing algorithm, may produce a hash in shorter time periods than previously used hashing algorithms. Therefore, an updated hashing algorithm may shorten processing time.

SUMMARY OF THE DISCLOSURE

Apparatus, methods and systems for one way data migrations are provided. A system may include a database. In some embodiments, the database may store data. Users may authenticate into the system by inputting a username and password into a front-end of the system. Such a front-end may be a webpage. Because the system may be prevented, blocked or barred from storing the password, the system may create and store a hash of the password. Therefore, when a user inputs a username and password to authenticate into the system, the password may be verified using the stored hash. Once the username and password are verified, the user may be able to access data included in the database.

In certain instances, the system and/or database may include one or more faults. The faults may include insufficient security. Therefore, it may be desirable to migrate the system and corresponding database to a new system and a new database. It should be noted that the password cannot be transferred directly from the original system to the new system because the password is not stored in the original system.

It should be noted that, for the purposes of this application, an old system may also be referred to as a first system, an original system, or a legacy system. Additionally, for the purposes of this application, a new system may also be referred to as a second system or a current system.

In some embodiments, in order to migrate database from the original system to a current system, the data included in the system may be shifted to the current system in real time as the user inputs a password. As such when a user logs into a front end of the systems, (i.e., concurrent with a password being input by the user) user credential data corresponding to the password (e.g., a username) may be migrated from the legacy system to the current system.

Migrating the corresponding data from the legacy system to the current system may include verifying the input password with the corresponding previously stored hash. Migrating the data from the legacy system to the current system may include creating a current hash for the password. It should be noted that the password may not have changed, however, the current system may use an updated hashing algorithm. Upon creation of the current hash, the current hash may be stored in the current system. The current hash may correspond to user credential data stored in the current database. An underlying pathway for the password that corresponds to the previously stored hash may be changed and a new underlying pathway associated with the current hash may be instituted.

It should be noted that upon the creation and/or storage of the current hash and migration of user credentials, the user may be flagged as migrated in the legacy database. User credentials may include the following: a username, a user hash, a user social security number, user identification number and/or any other suitable information. The legacy database and/or legacy system may be archived upon completion of migration of all, or a predetermined percentage of user data in the legacy database and legacy system. Once, a username and password of a specific user is migrated to the new system, when the user logs into the front-end, the user may be directed to the new system for authentication.

In some embodiments, user credentials and/or user credential data may include a username and password. In such embodiments, a separate database, such as an identifier database, may include additional information such as a user identification number, a username, a user address and/or any other suitable user information. In such embodiments, a user credential store, which may be included in the legacy database, may point to, or be linked to, the identifier database.

It should be noted that, at times, users may not initially input a username and/or password to access the legacy database. In such an event, a request may be transmitted to the user to input a password. As such, all users, or a predetermined percentage of users included in the legacy database may be flagged. The legacy system may be completely migrated. Upon migration completion, the legacy system and the legacy database may be archived.

In some embodiments, upon completion of a predetermined time period, a number of user identifiers (including usernames and passwords) may be migrated from the legacy system to the current system. However, there may be remaining user identifiers that may not be migrated from the legacy system to the current system. These unmigrated user identifiers may be associated with users that typically do not use web-based authentication protocols. In some embodiments, an entity, which maintains the legacy system and the current system, may support both the legacy system and the current system in order to ensure ease of access to all users.

In such embodiments, there may be times when an entity, which maintains the legacy system and the current system, intends to archive the legacy system. In certain embodiments, there may be times when an entity processor, associated with the entity, maintains the legacy system and the current system. As such, the system may identify which user identifiers have not been migrated from the legacy system to the current system. To identify the unmigrated user identifiers, when a user identifier is migrated from the legacy system to the current system, the user identifier may be flagged as migrated. An application may peruse the legacy system, or search through the legacy system, to identify one or more user identifiers that have not been flagged as migrated.

The entity and/or the entity processor may create a group of users. The group of users may be associated with the one or more user identifiers that have not been flagged as migrated. The group of users may be associated with a group of hashes that have not been flagged as migrated. The group of users and/or user identifiers may be labeled and/or flagged as unmigrated users.

The entity processor may transmit an invitation to one or more users included in the group of users. Each of the one or more users included in the group of users may receive the invitation on a mobile device. The mobile devices may have been previously associated or linked to each of the one or more users. The invitation may be received as an email, text message, chat or in other suitable communication channel. The invitation may include a request for the user to login to a webpage and/or input a username and password. The username and/or password may be input into a front-facing user interface. The invitation may also include a link that directs the user to a login webpage. For each user, upon receipt of a username and password, the migration process may be initiated for the user that completed a request.

Upon migration of all the users, the legacy system and/or the legacy database may be archived. At times, upon migration of a predetermined number or predetermined percentage of the users, the legacy system and/or legacy database may be archived. Also, at times, after a predetermined amount of time has lapsed since the invitation was transmitted, the legacy system and/or legacy database may be archived even in the event that not all users have been migrated.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
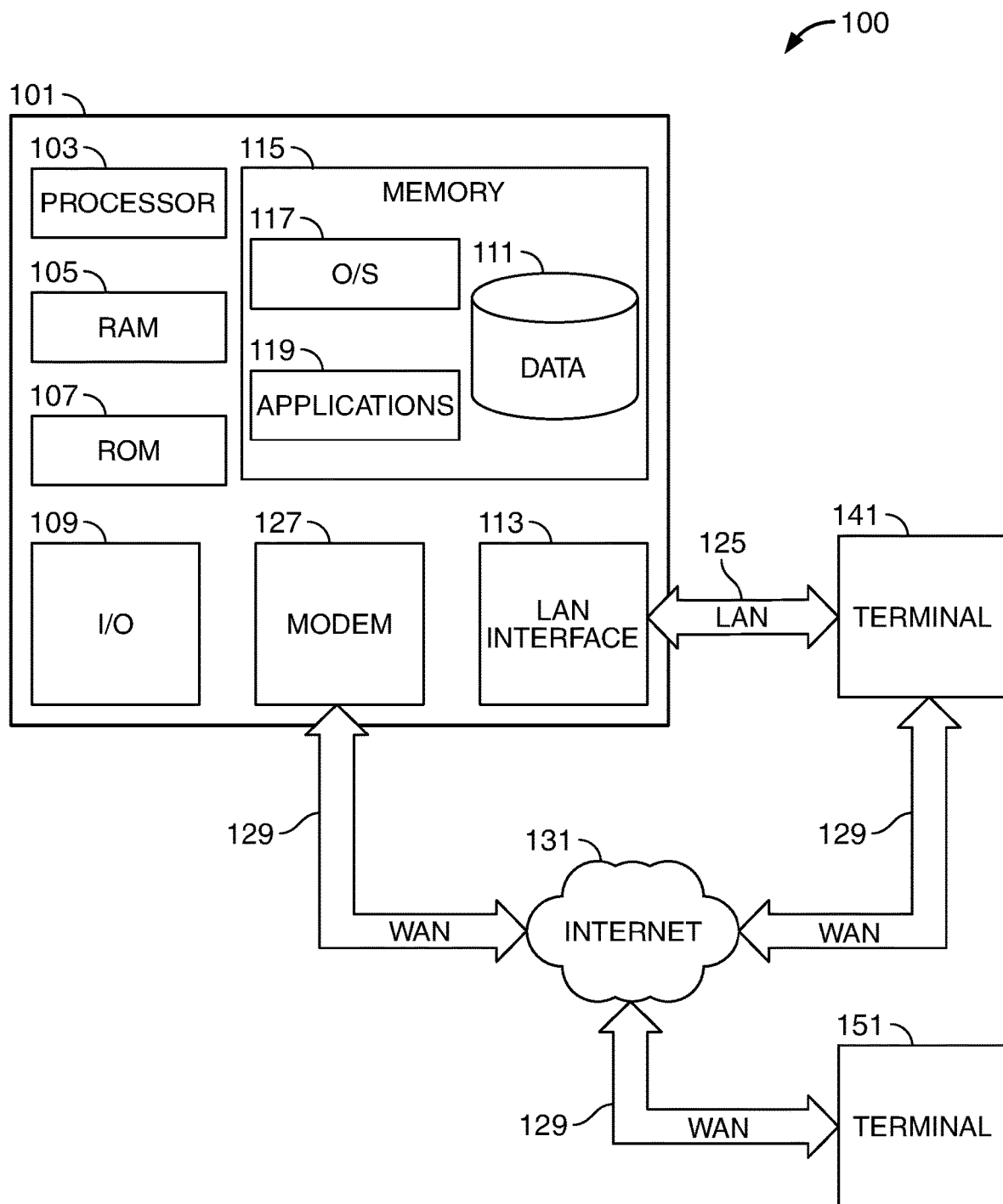
FIG. 1 shows an illustrative diagram in accordance with principles of the disclosure.

Apparatus, systems and methods for one-way data migration are provided. Methods may include transferring authentication data from a legacy database to a current database. The legacy database may be associated with a legacy system. The current database may form a part of a current system.

Methods may include receiving a request from a user to authenticate into a webpage. The request may include a username and password. The username and password may be authenticated by the legacy system using a previously stored hash. The previously stored hash may be linked to a user identifier. The previously stored hash may also be referred to as an original hash. The previously stored hash may have been previously formed from an application of an original hashing algorithm to the username and/or password.

Once the user has been authenticated, a current hash may be created for the username and/or password. The current hash may be created in real-time. The current hash may be stored in the current database. The underlying pathway, associated with the previously stored hash, may change to a current underlying pathway. The current underlying pathway may be for use with the current hash.

Upon the creation of the current hash, the username and/or password may be flagged as migrated. The flag may be stored in the legacy system, in the legacy database and/or in a location associated with the user. Such a location associated with the user may be a cookie location located on a personal computer ("PC") associated with the user. The user identifier may also be flagged. The flag may indicate that the user identifier, and associated data, has been migrated.

At times, after the creation and the storage of the current hash, the previously stored hash may be deleted. In some embodiments, a self-delete algorithm may delete the previously stored hash upon creation and storage of the current hash. The legacy system and/or legacy database may be archived upon the completion of the migration and deletion of previously stored hash.

The method may be executed as the user authenticates into the legacy system. As such, the migration may occur in real-time.

The legacy database and legacy system may be adapted to process a 256-bit hash. The current system and current database may be adapted to process a 512-bit hash. As a result of increasing the bitstream from 256 to 512, the current system may increase security and speed over the legacy system. As such, migrating from the legacy system to the current system may increase security and speed of an authentication system.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of apparatus 100 that includes a computer 101. Computer 101 may alternatively be referred to herein as a "computing device." Elements of apparatus 100, including computer 101, may be used to implement various aspects of the apparatus and methods disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101—e.g., the operating system 117 and applications 119 such as an artificial intelligence implemented termination program and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as an artificial intelligence implemented termination program and security protocols) along with any other data 111 (e.g., historical data, configuration files) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, Wi-Fi, cellular networks, or other suitable frequencies.

Any memory may be comprised of any suitable permanent storage technology—e.g., a hard drive or other non-transitory memory. The memory may store software including an operating system and any application(s) (such as an artificial intelligence implemented termination program and security protocols) along with any data needed for the operation of the apparatus and to allow bot monitoring and IoT device notification. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or Wi-Fi).

Terminals 141 and 151 may be personal computers, smart mobile devices, smartphones, IoT devices, or servers that include many or all of the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, Wi-Fi, cellular networks or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for an artificial intelligence implemented termination program and security protocols, as well as other programs. In an embodiment, one or more programs, or aspects of a program, may use one or more artificial intelligence/machine learning ("AI/ML") algorithm(s). The various tasks may be related to terminating or preventing a malicious AI from completing its malicious activities.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
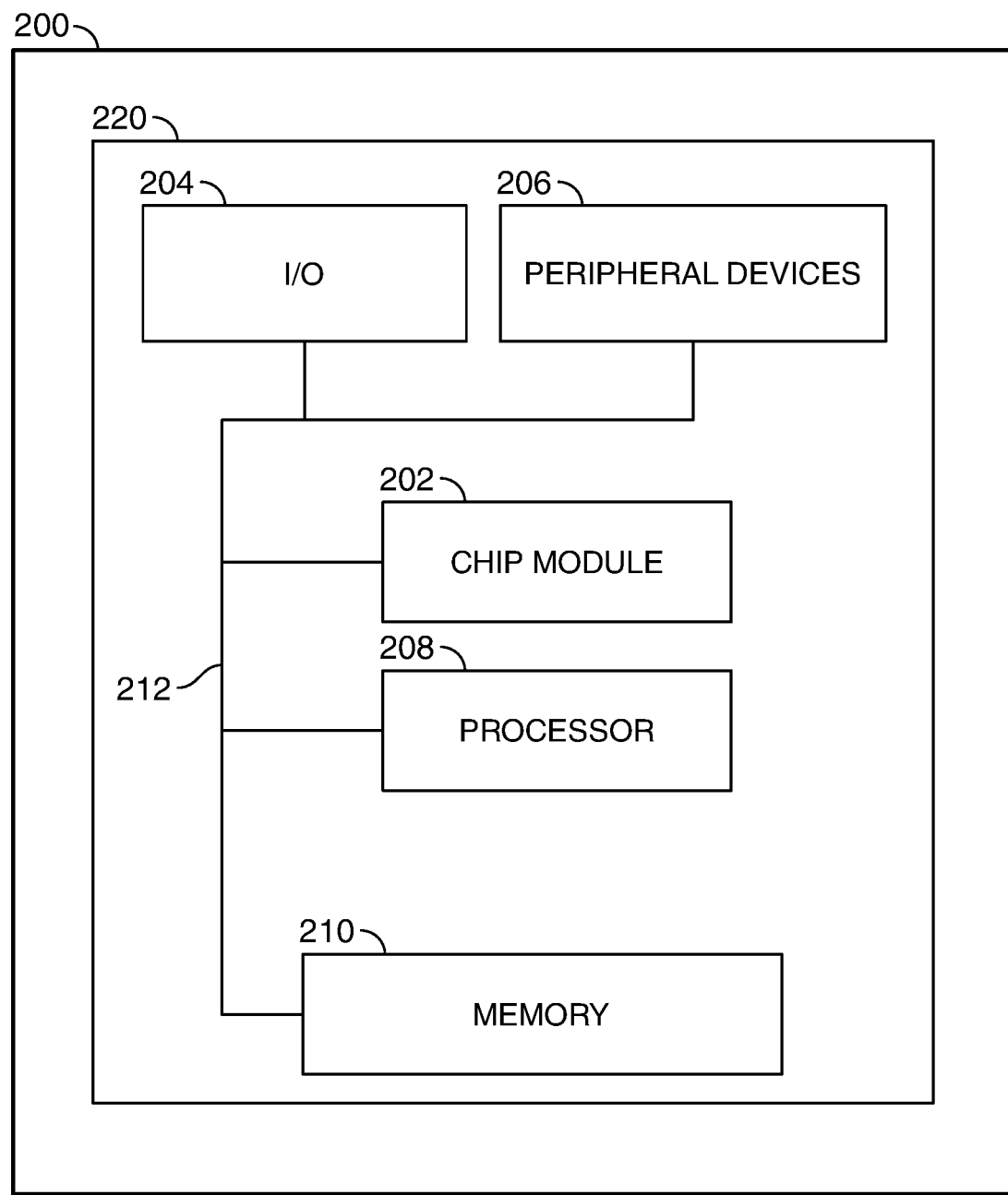
FIG. 2 shows another illustrative diagram in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1-10. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, a display (LCD, LED, OLED, etc.), a touchscreen or any other suitable media or devices, peripheral devices 206, which may include other computers, logical processing device 208, which may compute data information and structural parameters of various applications, and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
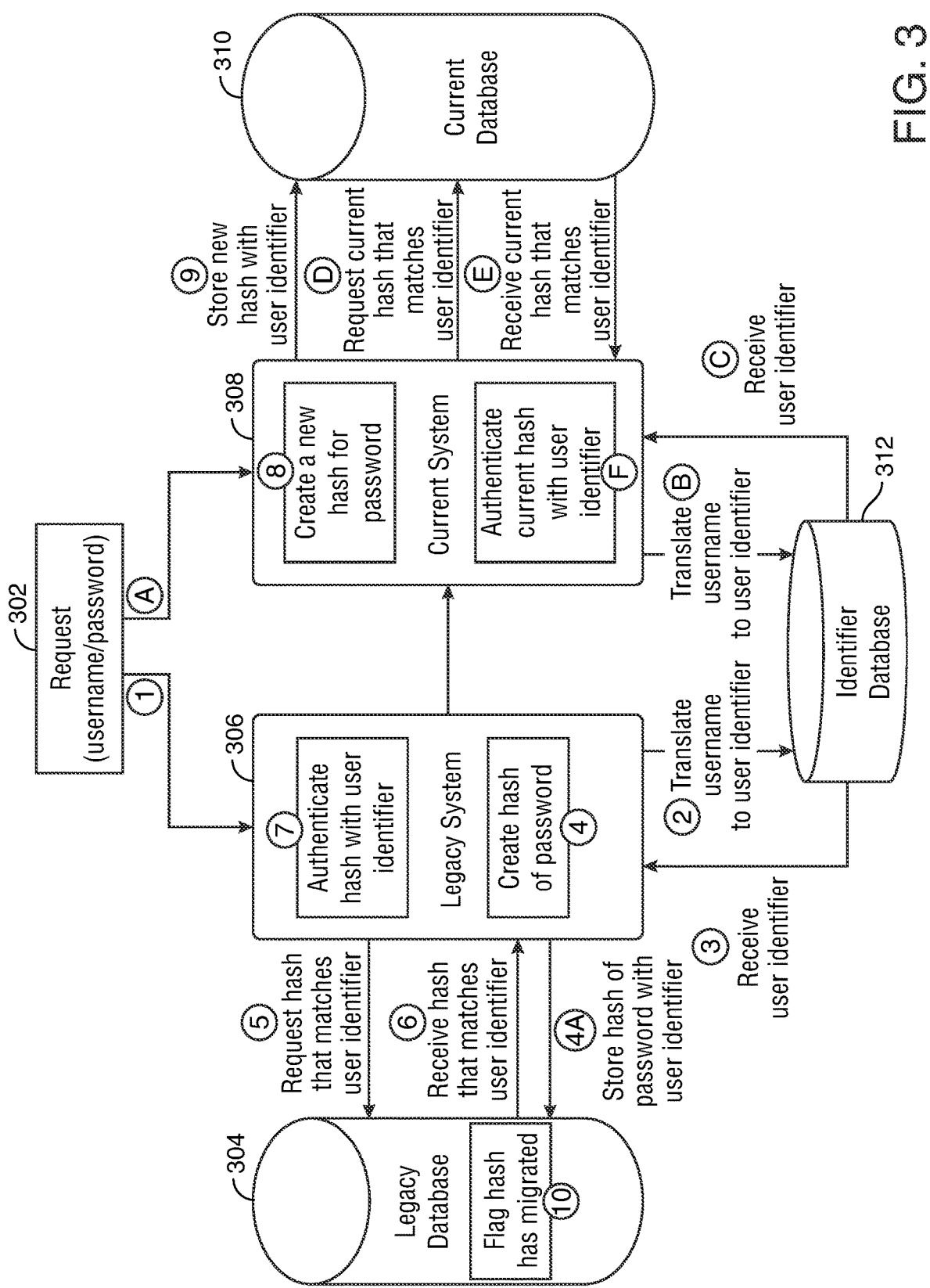
FIG. 3 shows an illustrative flow diagram in accordance with the principles of the disclosure.

FIG. 3 shows an illustrative flow diagram. The flow diagram shows pre-migration, one-way data migration and post-migration processes. Pre-migration may include user authentication into a legacy system. One-way data migration may include shifting authentication data from the legacy system to a current system. Post-migration may include user authentication into the current system.

The pre-migration process may include an initial request from a user and/or users and one or more subsequent requests from the user. The initial request may be the first login request received from the user. The subsequent requests may be one or more additional login requests (subsequent to the first login request) received from the user.

An initial request may be received from a user. The initial request may include a username and a password. The initial request may be a request to authenticate a user into a webpage. The initial request may be request 302. Step 1 shows the request 302 being transmitted to legacy system 306. Legacy system 306 may receive request 302. Legacy system 306 may include a server, a processor, a receiver, a database and/or any other suitable hardware or software components.

Legacy system 306 may translate, as shown at step 2, the received username to a user identifier using identifier database 312. Identifier database 312 may include a listing of user identifiers and associated usernames. A user identifier may be an alphanumeric character set used to refer to a particular user. A user identifier may be selected by an entity, such as an entity executing the legacy system. A username may also be an alphanumeric character set. However, the username may be selected by the user or by the entity. It should be noted that the username may be human-readable while the user identifier may be computer-readable. Legacy system 306 may receive the user identifier from identifier database 312, as shown at step 3.

As shown at step 4, legacy system 306 may use a hashing algorithm to create an original hash of the password included within request 302. As shown at step 4A, the original hash may be stored at legacy database 304. The original hash may be linked to the user identifier within legacy database 304. Therefore, during subsequent requests, legacy database 304 may be used to verify the authenticity of a request that includes a username and password. Legacy database 304 may include a credential store. The credential store may include, for one or more users, a username, a user hash, a user social security number, a user identification number and/or any other suitable information. It should be noted that additional security questions and/or protocols may be implemented at the initial request.

A subsequent request may be received from the user. The subsequent request may be a request from the user to authenticate the user into a webpage. The subsequent request may be request 302. Step 1 shows subsequent request 302 being transmitted to legacy system 306. Legacy system 306 may receive request 302.

Legacy system 306 may translate, as shown at step 2, the received username to a user identifier using identifier database 312. Legacy system 306 may receive the user identifier from identifier database 312, as shown at step 3.

Legacy system 306 may perform a hashing algorithm on the password, as shown at step 4. The result of the hashing algorithm may be a real-time hash. As shown at step 5, legacy system 306 may request the original hash that matches the user identifier, from legacy database 304. Legacy system 306 may receive the original hash from legacy database 304, as shown at step 6. As shown at step 7, the user may be authenticated into legacy system 306 when the user identifier and password are verified by comparing the real-time hash with the original hash. As such, the authenticated user may be able to access the webpage and/or any other suitable assets that accept authenticated users.

A one-way data migration process may be used to migrate user credentials from legacy database 304 to current database 310. Because both legacy database 304 and current database 310 may be prevented from storing passwords, the one-way data migration process may involve rehashing and restoring a hash of the password. The one-way data migration process may be initiated when a subsequent request, such as request 302, is received from a user. The subsequent request may be a request from the user to authenticate the user into a webpage. As such, the one-way data migration process may include legacy system 306 receiving request 302, as shown at step 1.

Migration process may also include step 2, which shows legacy system 306 translating the received username to a user identifier using identifier database 312. Legacy system 306 may also receive the user identifier from identifier database 312, as shown at step 3.

Legacy system 306 may perform a hashing algorithm on the password, as shown at step 4. The result of the hashing algorithm may be a real-time hash. As shown at step 5, legacy system 306 may request, from legacy database, the original hash that matches the user identifier and password associated with the request. Legacy system 306 may receive the original hash from legacy database 304, as shown at step 6. Legacy system 306 may compare the real-time hash to the original hash. In some embodiments, the comparison may be executed at legacy database 304 or at any other suitable location. As shown at step 7, the user, associated with the user identifier, username and password, may be authenticated into legacy system 306 when the real-time hash matches the original hash.

Upon authentication of the user, the one-way data migration process from legacy system 306 and legacy database 304 to current system 308 and current database 310 may be initiated. It should be noted that current system 308 and current database 310 may utilize one or more updated hashing algorithms, one or more updated hardware components and/or one or more updated software components. As such, current system 308 and current database 310 may provide faster response time than legacy system 306 and legacy database 304.

Because the one-way data migration may be executed in real-time when request 302 is received, current system 308 may be able to retrieve the password from request 302. As such, as shown at step 8, current system 308 may execute a hashing algorithm on the password, included in request 302, to create a current hash. It should be noted that the hashing algorithm used by current system 308 may be different from the hashing algorithm shown in legacy system 306. Therefore, the hash produced by the hashing algorithm within legacy system 306 may be different from the hash produced by the hashing algorithm within current system 308. The current hash may be stored at current database 310, as shown at step 9. The current hash may be linked to the user identifier within current database 310. The current hash may be used in the current system. As such, the current hash may be used instead of the original hash.

During requests subsequent to the one-way data migration, current database 310 may be used to verify the authenticity of a request that includes a username and password. Current database 310 may include a credential store (similar to the credential store within legacy database 304). The credential store may include, for one or more users, a username, a user hash, a user social security number, a user identification number and/or any other suitable information. It should be noted that, at times, additional security questions and/or protocols may be implemented at the request that may be the first request directed to current system 308.

Upon the creation and storage of the current hash, the original hash in legacy database 304 may be flagged as migrated, as shown at step 10. A username, password and/or user identifier and/or any other suitable information stored within legacy system 306 and/or legacy database 304 may be flagged as well, indicating the user as migrated. The flag may be stored in legacy system 306, legacy database 304 and/or in a location associated with the user. Such a location associated with the user may be a cookie location on a PC associated with the user.

It should be noted that the flag may be used for multiple purposes. The flag may provide an indication to one or more systems, such as legacy system 306, to forward a received request from legacy system 306 to current system 308. Additionally, a flag stored at a user PC location may direct a request directly to current system 308 without user participation.

Furthermore, the flag may be used to archive legacy system 306 and legacy database 304. As such, once all of the users, or greater than a percentage number of users, have been flagged as migrated within legacy database 304, legacy database 304 may be archivable. Upon migration of all users or greater than a percentage number of users, legacy system 306 and/or legacy database 304 can be archived.

Upon the migration of the user and/or user credentials from legacy system 306 and legacy database 304 to current system 308 and current database 310, a post-migration authentication process may be utilized. It should be noted that the pre-migration, migration and post-migration processes may be executed as hidden processes, and the user may be unaware of the process execution.

The post-migration process may include a subsequent request, such as request 302, received from a user. The subsequent request may be a request from the user to authenticate the user into a webpage.

As described above, request 302 may include a username and password. The flag that indicates that the user, associated with request 302, has been migrated, may direct the user to current system 308, as shown in step A.

Current system 308 may include a receiver, a processor, a server, a database and/or any other suitable hardware and/or software. Current system 308 may receive request 302. Current system 308 may translate, as shown at step B, the received username to a user identifier using identifier database 312. A user identifier may be selected by an entity, such as an entity executing current system 308. Current system 308 may receive the user identifier from identifier database 312, as shown at step C.

Step C may be followed by step 8. As shown at step 8, current system 308 may use a hashing algorithm to create a real-time hash of the password. Step 8 may be followed by step D. As shown at step D, current system 308 may request, from current database 310, a current hash that is associated with request 302. Current system 308 may receive the current hash from current database 310, as shown at step E. As shown at step F, the user may be authenticated into current system 308 when the current hash (and associated username, user identifier and other user credentials) are verified using the real-time hash. As such, the migration process of a single user may be completed. The migration process of all users may be completed when all of the users within legacy database 304 have been flagged and the legacy database has been archived.

Figure 4:
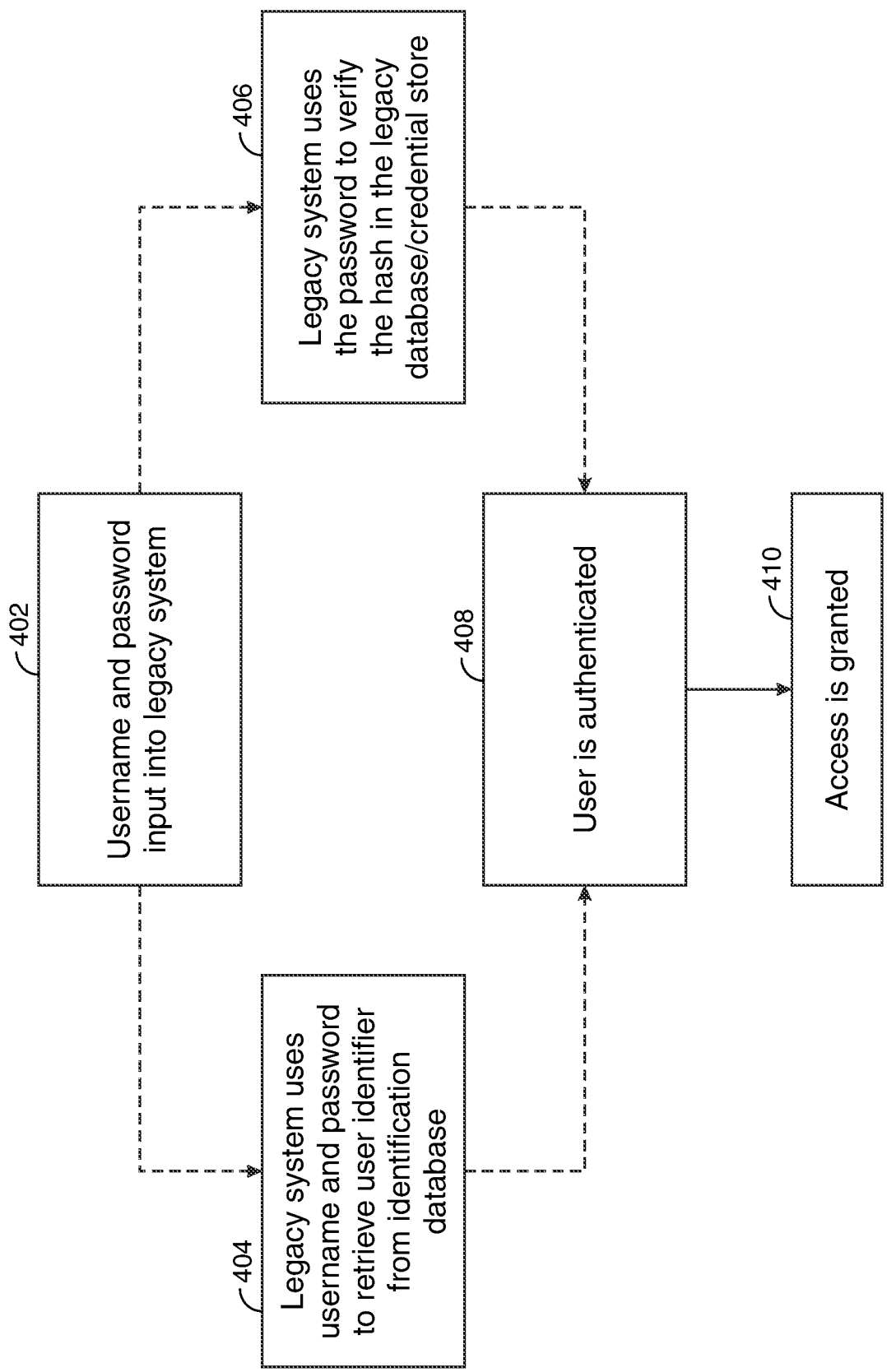
FIG. 4 shows another illustrative flow diagram in accordance with the principles of the disclosure.

FIG. 4 shows an illustrative flow diagram. The flow diagram shows a pre-migration process. The pre-migration process may include an initial request from a user and/or users. The pre-migration process may also include one or more subsequent requests from the user and/or users. The initial request may be the first login request received from the user. The subsequent request(s) may be one or more additional login requests (subsequent to the initial login request) received from the user.

An initial request may be received from a user. The initial request may include a username and a password. The initial request may be a request to authenticate a user into a webpage. The initial request may be shown at 402. A legacy system may receive the request, shown at 402. The legacy system may include a server, a processor, a receiver, a database and/or any other suitable hardware or software components.

The request, shown at 402, may include a username and password. The request may be input into the legacy system. The legacy system may attempt to translate the username into a user identifier. The translation may be used because the legacy system may correlate user identifiers with password hashes as opposed to correlating usernames with password hashes. As such, the legacy system may retrieve the user identifier from identifier database when the legacy system is presented with a user identifier, as shown at 404.

The legacy system may execute a hashing algorithm on the password included within the request. During an initial request, the result of the hashing algorithm may be stored within a legacy database. During a subsequent request, the result of the hashing algorithm may be compared to an original hash, previously stored within the legacy database, as shown at 406. When the original hash matches the previously stored hash, the request may be authenticated, as shown at 408. Upon authentication of the request, access to the webpage and any other associated assets may be granted to the user, as shown at 410.

Figure 5:
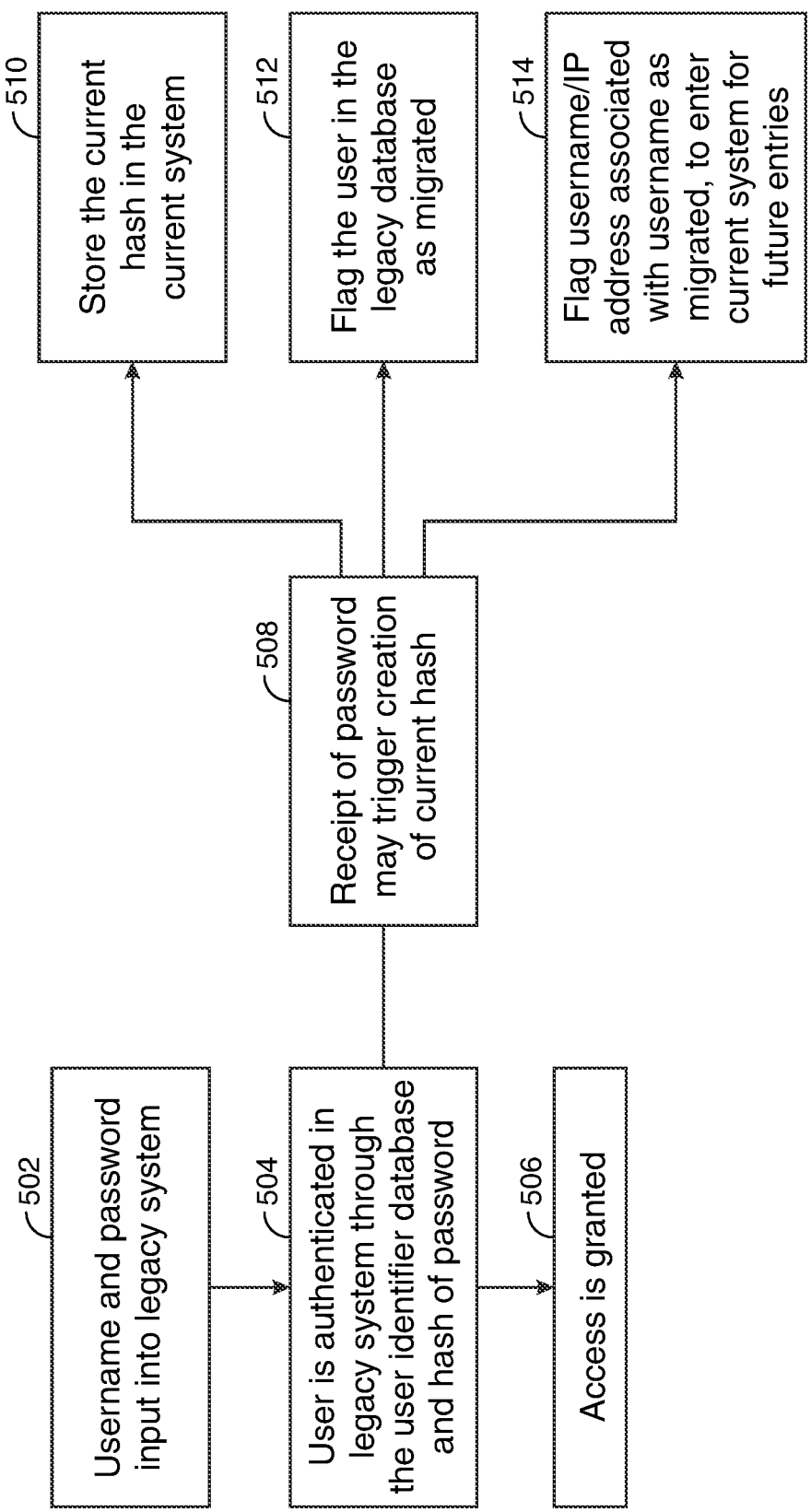
FIG. 5 shows still another illustrative flow diagram in accordance with the principles of the disclosure.

FIG. 5 shows an additional flow diagram. The flow diagram shows a one-way data migration process. A subsequent request may be received from a user. The subsequent request may include a username and password, as shown at 502. Upon receiving the request, the one-way data migration process may be initiated. The subsequent request may be a request from the user to authenticate into a webpage. The user may be authenticated when the result of a hashing algorithm executed on the password, included in the request, is equivalent to a hash, previously associated with the user, stored within the legacy database. Upon authentication, access to the webpage may be granted to the user, as shown at 506.

Additionally, once the user has been authenticated into the legacy system, a migration process may be initiated. Receipt of the password, within the request, may trigger the creation of a current hash within the current system, as shown in step 508. The current hash may be stored in a current system, as shown at 510. Storing the current hash within the current system may trigger data corresponding to the user to be migrated from the legacy system to the current system. Data corresponding to the user may include username, user credentials and/or any other data corresponding to the user.

Creation of the current hash may also trigger flagging the user (and/or associated user credentials) in the legacy database as migrated, as shown at 512. Additionally, creation of the current hash may also trigger flagging the username and/or IP address associated with username as migrated. The flag may direct one or more subsequent requests that include a migrated username and/or requests from an IP address identified as migrated to be directed directly to the current system.

Figure 6:
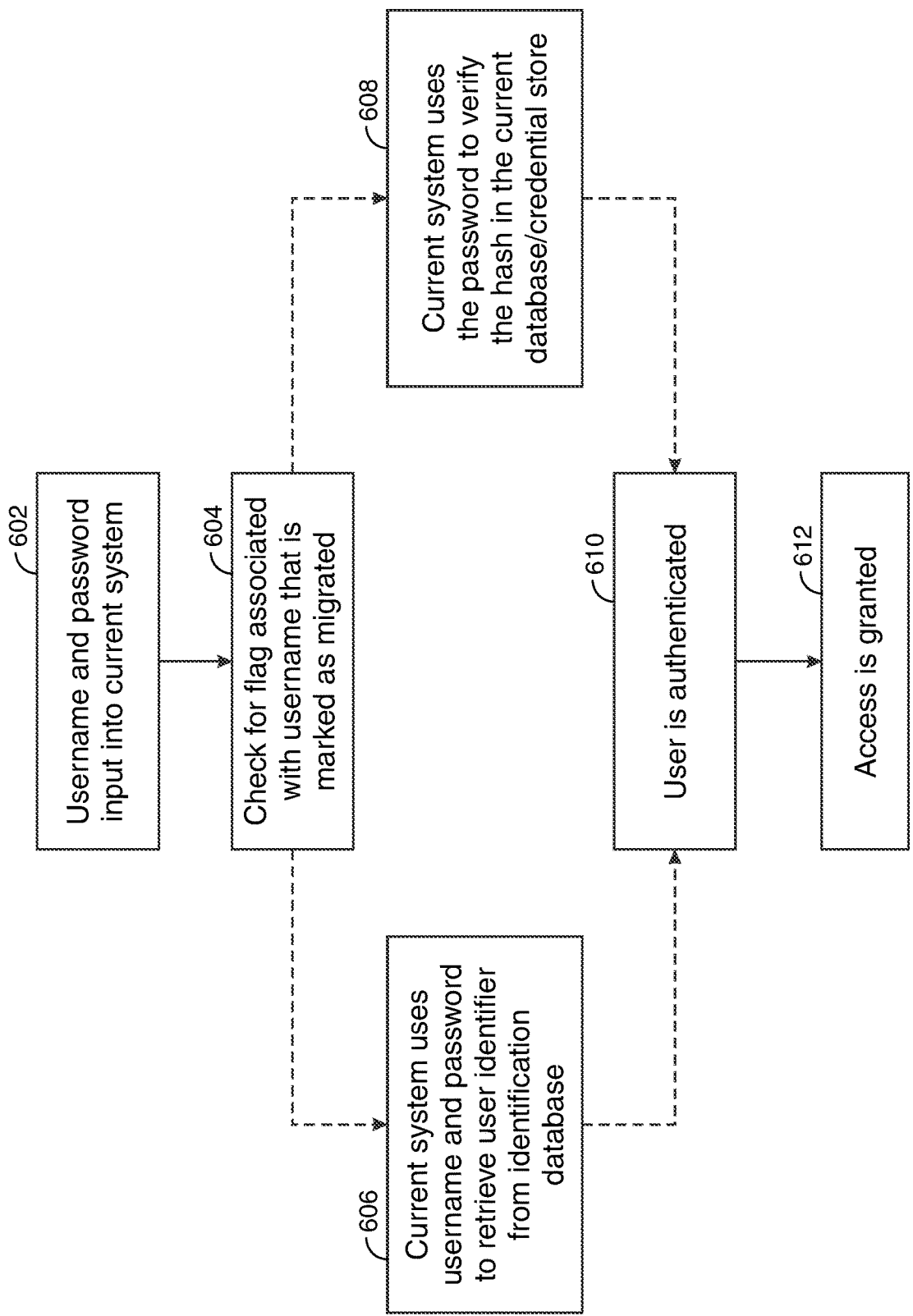
FIG. 6 shows yet another illustrative flow diagram in accordance with the principles of the disclosure.

FIG. 6 shows a flow diagram. The flow diagram shows the post-migration process. Upon migration of a user and/or user credentials from a legacy system to a current system, the post-migration process can be initiated. The post-migration process may involve requests received subsequent to the user and/or user credentials being flagged as migrated.

A subsequent request may be received from a user. The subsequent request may include a username and password. The subsequent request may be a request from the user to authenticate into a webpage. The subsequent request may be shown at 602. The request, shown at 602, may correspond to request 302 in FIG. 3.

The request, shown within 602, may include a username and password. A gateway may be used to direct a request to the legacy system or to the current system. The gateway may include the legacy system. The gateway may include the current system. The gateway may include a cookie located at a user device.

When the gateway is included within the legacy system, the legacy system may receive a request. The legacy system may check the legacy database to determine whether the request is associated with a migrated username, as shown at 604. If the request is associated with a migrated username, the request may be directed to the current system. At times, the current system may retrieve a user identifier from an identifier database, as shown at 606. At times, the current system may verify the username and password using the current hash stored in the current database, as shown at 608. Upon completion of 606 and/or 608, the request may be authenticated. Upon authentication, access to the webpage may be granted to the user.

Figure 7:
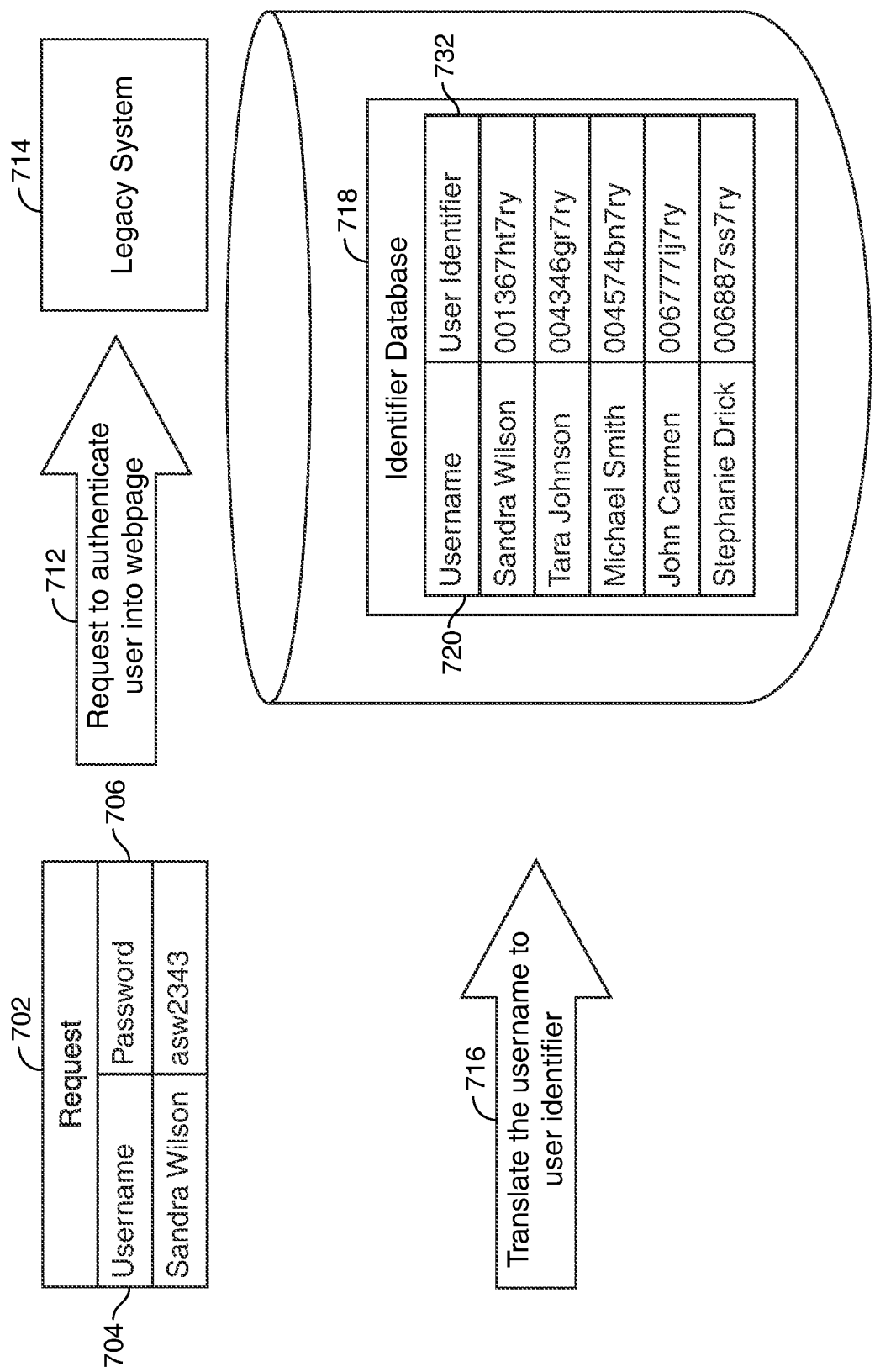
FIG. 7 shows still another illustrative diagram in accordance with the principles of the disclosure.

FIG. 7 shows an illustrative data transfer diagram. An exemplary request is shown at 702. Request 702 may include username (Sandra Wilson) 704 and password (asw2342) 706. Request 702 may be a user requesting access to a predetermined webpage, as shown at 712. The predetermined webpage may be based on a user selection. A user, transmitting request 702, may preferably be granted access to the webpage only after username 704 and password 706 are authenticated.

Legacy system 714 may receive request 702. Legacy system 714 may translate the username, included in request 702, to a user identifier. Legacy system 714 may communicate with identifier database 718 to translate a username (shown at 720) to a user identifier (shown at 732). It should be noted that identifier database 718 may include a listing of usernames and associated user identifiers. Furthermore, the usernames may be selected by the users, while the user identifier may be selected by an entity that maintains identifier database 718. At times, the user identifier may not be available to the user. It should be noted that the user identifier may be used internally and/or externally by an entity to identify the user.

Figure 8:
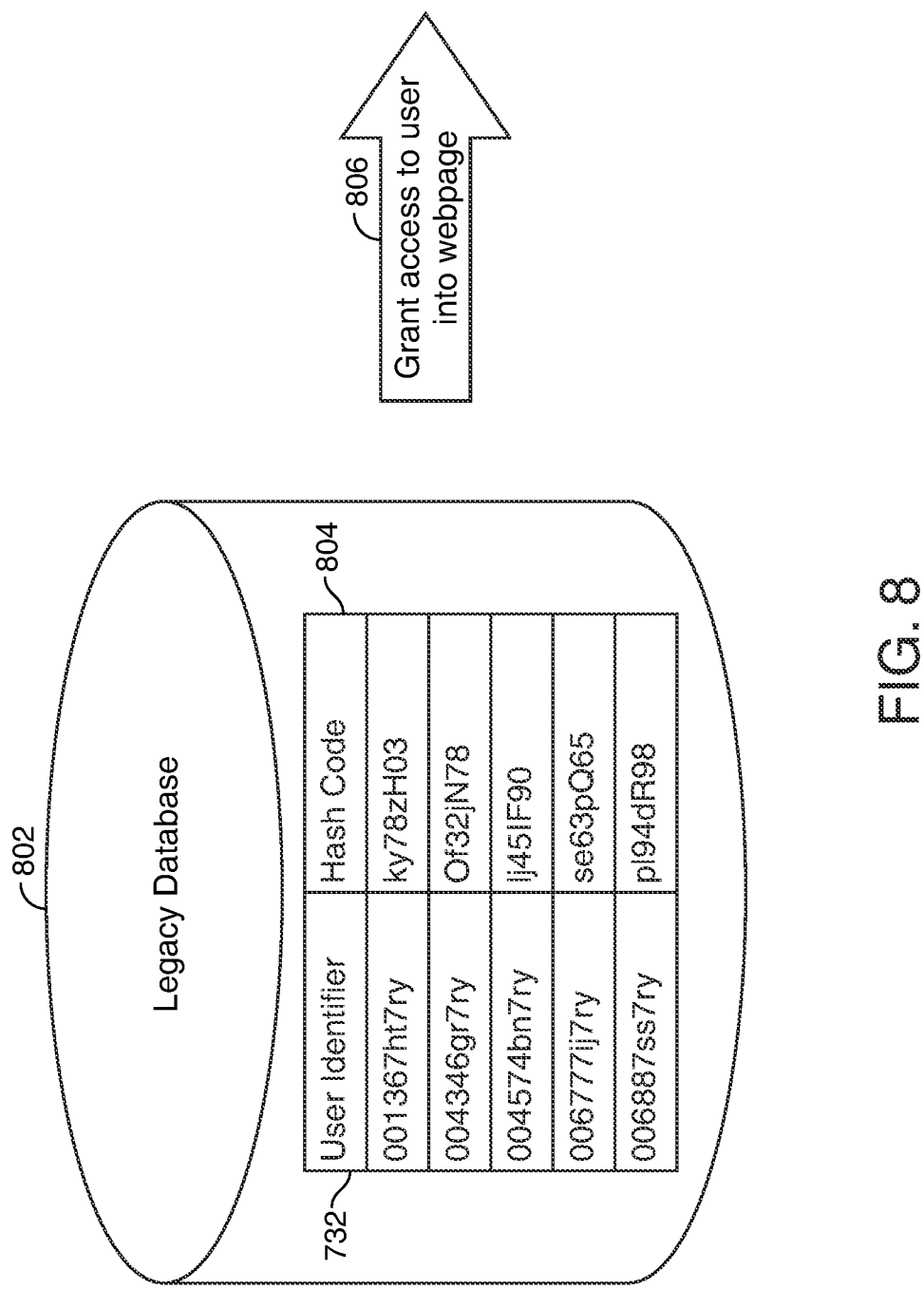
FIG. 8 shows an illustrative hybrid diagram in accordance with the principles of the disclosure.

FIG. 8 shows an illustrative hybrid data transfer diagram. Upon receipt of the user identifier, request 702, which may be linked to the user identifier may be further directed to an authentication process. The user identifier linked to request 702 may be included in legacy database 802. Legacy database 802 may include a listing of user identifiers (shown at 732) and hash codes (shown at 804). The user identifier may preferably correspond to a hash code stored in the legacy database 802. The hash code may have been created by executing a hashing algorithm on the password received within a request that included the username and password. Upon retrieval of hash code, from legacy database 802, that matches a real-time hash code produced by executing a hashing algorithm on the password received within request 702, a user may be authenticated. The authenticated user may be granted access to the predetermined webpage, as shown at 806.

Figure 9:
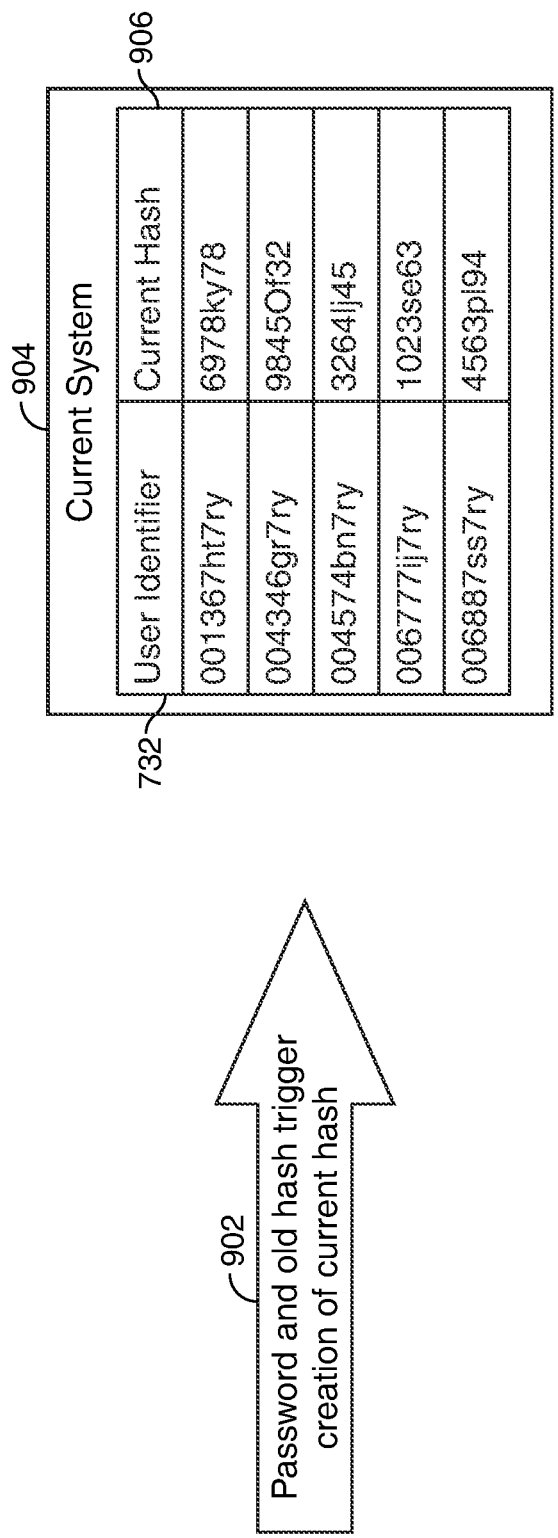
FIG. 9 shows another illustrative hybrid diagram in accordance with the principles of the disclosure.

FIG. 9 shows an illustrative data hybrid architectural diagram that may be executed during a migration process. A hash code may correspond to a user identifier (shown at 732) within current system 904. The hash code may be used to authenticate a user. The authentication may be used to grant the user access to the predetermined webpage and/or to a current database. As the migration process occurs, the password and previously-used (also referred to herein as "old") hash may trigger creation of a current hash, as shown at 902. The current system may create the current hash. The current system may also store the current hash, as shown at 906. The current hash may be linked to the user identifier, as shown at 732. The creation of current hash 906 may cause execution of a one-way data migration between a legacy system (not shown) and a current system (904). The migration may occur in real time.

Figure 10:
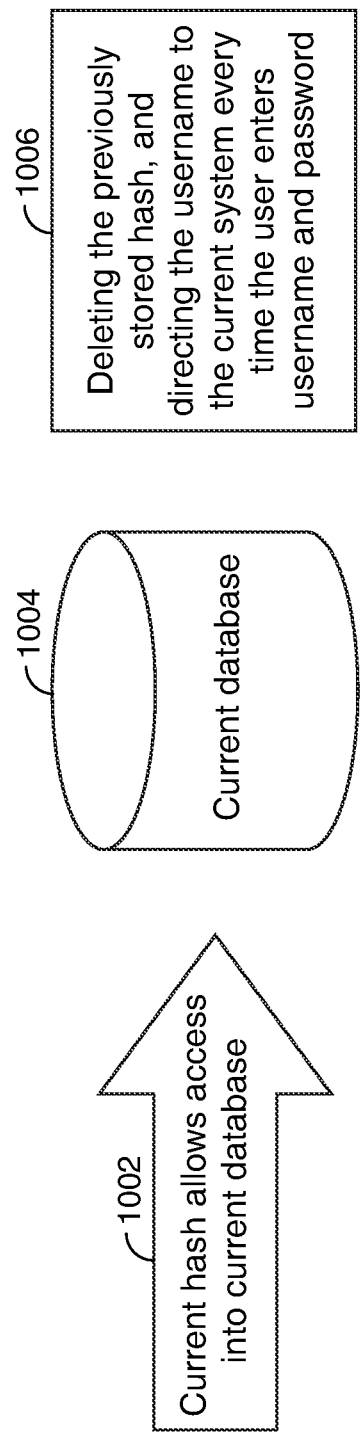
FIG. 10 shows still another illustrative hybrid diagram in accordance with the principles of the disclosure.

FIG. 10 shows an illustrative data hybrid diagram of post-migration. A user may be granted access to current database 1004 (and/or any other suitable assets or webpages) based on authentication of a username and password included in a request. Authentication of a username and password may be executed using a current hash, as shown at 1002. Upon the creation and the usage of a current hash, the previously used hash may execute a self-delete command, as shown at 1006. Additionally, shown at 1006, a request that is associated with user credentials that has been stored within the current system may be directed to the current system. A current hash may be used to authenticate following migration, also shown at 1006.

Thus, a one-way data migration system is provided. Persons skilled in the art will appreciate that the present invention can be practiced by other than the described embodiments, which are presented for purposes of illustration rather than of limitation. The present invention is limited only by the claims that follow.

What is claimed is:

1. A method for one-way data migration, said one-way data migration shifting authentication data from a legacy database to a current database, said legacy database being located at a legacy system, said current database forming a part of a current system, the method comprising:
   receiving a request from a user to authenticate into a webpage, the request comprising a username and password;
   authenticating the username and password in the legacy system using a previously stored hash, the previously stored hash being linked to a user identifier, said user identifier being formed from an application of a previous hashing algorithm to the password;
   creating a current hash for the password by applying a current hashing algorithm to the password, said creating the current hash initiating the migration from the legacy system to the current system, said migration for migrating user credentials associated with the password;
   storing the current hash in the current database;
   changing an underlying pathway associated with the previously stored hash to a current underlying pathway for use with the current hash;
   upon creation and/or storage of the current hash, flagging the user in the legacy system as migrated;
   storing a flag in a cookie location on a personal computer ("PC") associated with the user;
   directing a request received at the legacy system to the current system, said directing using a gateway; and
   perusing the legacy system to identify one or more users not flagged as migrated;
   upon identifying one or more users not flagged as migrated, transmitting an invitation to the one or more users not flagged as migrated, said invitation including a request for the one or more users to login to a webpage;
   receiving an input of the user's username and password; and
   after a predetermined amount of time elapsed from transmitting the invitation, independent of whether the request was received, archiving the legacy system.

2. The method of claim 1 further comprising deleting the previously stored hash in response to creating and/or storing the current hash.

3. The method of claim 1 wherein the migration occurs in real-time.

4. The method of claim 1 wherein the previous hashing algorithm is adapted to produce a 256-bit hash.

5. The method of claim 1 wherein the current hashing algorithm is adapted to produce a 512-bit hash.

6. A method for one-way data migration, said one-way data migration shifting data from a legacy database to a current database, said legacy database being located at a legacy system, said current database forming a part of a current system, the method comprising:
   transmitting a request to a user to input a username and password;
   receiving, in response to transmitting the request, an input comprising the username and password;
   authenticating the username and password in the legacy system using a previously stored hash, the previously stored hash:
      linked to a user identifier that corresponds to the username; and
      previously created from a previous hashing algorithm applied to the password;

creating a current hash for the password by applying a current hashing algorithm to the password, said creating a current hash initiating the migration from the legacy system to the current system, said migration for migrating user credentials associated with the password;

storing the current hash in the current database;

changing an underlying pathway associated with the previously stored hash to a current underlying pathway for use with the current hash;

flagging the user in the legacy system as migrated upon the storing of the current hash;

storing a flag in a cookie location on a personal computer ("PC") associated with the user;

directing a request received at the legacy system to the current system, said directing using a gateway;

perusing the legacy system to identify a group of one or more users not flagged as migrated;

transmitting an invitation, said invitation including a request for the user to login to a webpage and/or input a username and password, to the one or more users included in a group of users not flagged as migrated;

receiving an input of the user's username and password; and after a predetermined amount of time from transmitting the invitation, independent of whether the request was received, archiving the legacy system upon migrating all user identifiers from the legacy database.

7. The method of claim 6 further comprising deleting the previously stored hash in response to storing the current hash.

8. The method of claim 6 wherein the migration occurs in real-time.

9. The method of claim 6 wherein, prior to transmitting the request to the user identifying that the user has been flagged within the legacy database as unmigrated.

10. The method of claim 6 wherein:
the previous hashing algorithm is adapted to produce a 256-bit hash; and
the current hashing algorithm is adapted to produce a 512-bit hash.

11. A one-way data migration apparatus, said one-way data migration shifting authentication data from a legacy database to a current database via a legacy system and a current system, the one-way data migration apparatus comprising:
a backend server comprising:
a backend receiver;
a backend processor; and
a backend transmitter, said backend transmitter configured to transmit an invitation to a user's mobile device, said invitation to prompt the user to input a username and a password into a front-facing user interface, said user's mobile device comprising a mobile device processor;
a legacy database operating in tandem with the backend server, the legacy database configured to store a plurality of usernames and a plurality of user passwords, each username included in the plurality of usernames associated with a user password included in the plurality of user passwords;
a current database operating in tandem with the backend server, the current database configured to store a current hash;
wherein, for one or more of the plurality of usernames and user passwords:

the backend receiver is configured to receive the username and the associated user password from the user's mobile device;

the backend processor is configured to authenticate the received username and the received password in the legacy system via a previously stored hash;

the backend processor is configured to create the current hash for the received password; and the backend processor is configured to store the current hash in the current database, changing an underlying pathway associated with the previously stored hash to a current underlying pathway for use with the current hash;

storing a flag in a cookie location on a personal computer ("PC") associated with the user;

the backend processor is configured to flag users in the legacy system as migrated;

the backend processor is configured to peruse the legacy system for one or more users not flagged as migrated;

the backend transmitter is configured to transmit a second invitation to the one or more users not flagged as migrated, said second invitation including a request for the one or more users to login to a webpage;

receiving an input of the user's username and password; and the legacy system is configured to be archived after a predetermined amount of time elapsed from transmitting the second invitation independent of whether the request was received.

12. The one-way data migration apparatus of claim 11 wherein the backend processor is configured to flag one or more user identifiers as migrated in the legacy database upon creation of the current hash.

13. The one-way data migration apparatus of claim 12, wherein the backend processor is configured to execute a search in the legacy database to identify a group of user identifiers that are not flagged as migrated.

14. The one-way data migration apparatus of claim 13, wherein the backend transmitter is configured to transmit an invitation to a group of mobile devices, said group of mobile devices associated with the group of user identifiers.

15. The one-way data migration apparatus of claim 11 wherein the backend processor is configured to flag one or more user identifiers as migrated in the legacy database upon storage of the current hash.

16. The one-way data migration apparatus of claim 15, wherein the backend processor is configured to execute a search in the legacy database to identify a group of user identifiers that are not flagged as migrated.

17. The one-way data migration apparatus of claim 16, wherein the backend transmitter is configured to transmit an invitation to a group of mobile devices, said group of mobile devices associated with the group of user identifiers.

18. The one-way data migration apparatus of claim 11, wherein the backend processor is further configured to delete the previously stored hash upon the storing of the current hash.

19. The one-way data migration apparatus of claim 11, wherein the backend processor is configured to create the current hash in real-time.

* * * * *